July 5, 1949.  O. LARSEN  2,475,550
SHAFT SEAL

Filed April 24, 1947  2 Sheets-Sheet 1

INVENTOR.
Olaf Larsen
BY
Hewitt F. Dixon
Atty.

July 5, 1949.　　　　　O. LARSEN　　　　　2,475,550
SHAFT SEAL
Filed April 24, 1947　　　　　　　　　　2 Sheets-Sheet 2
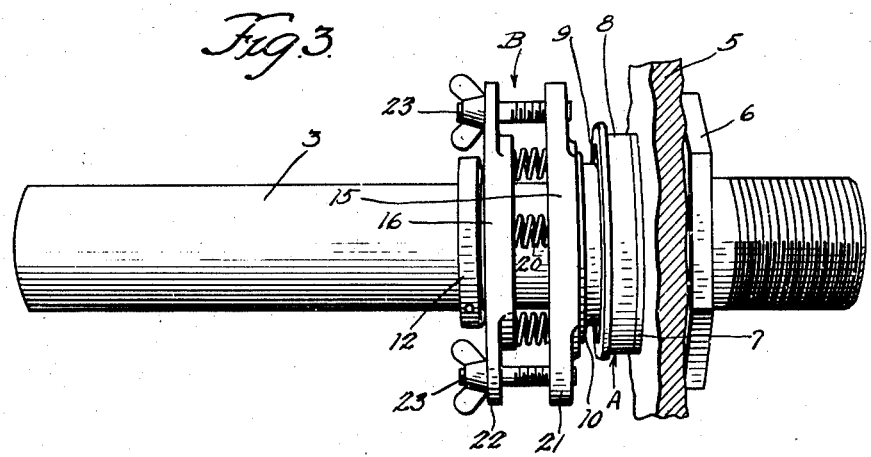
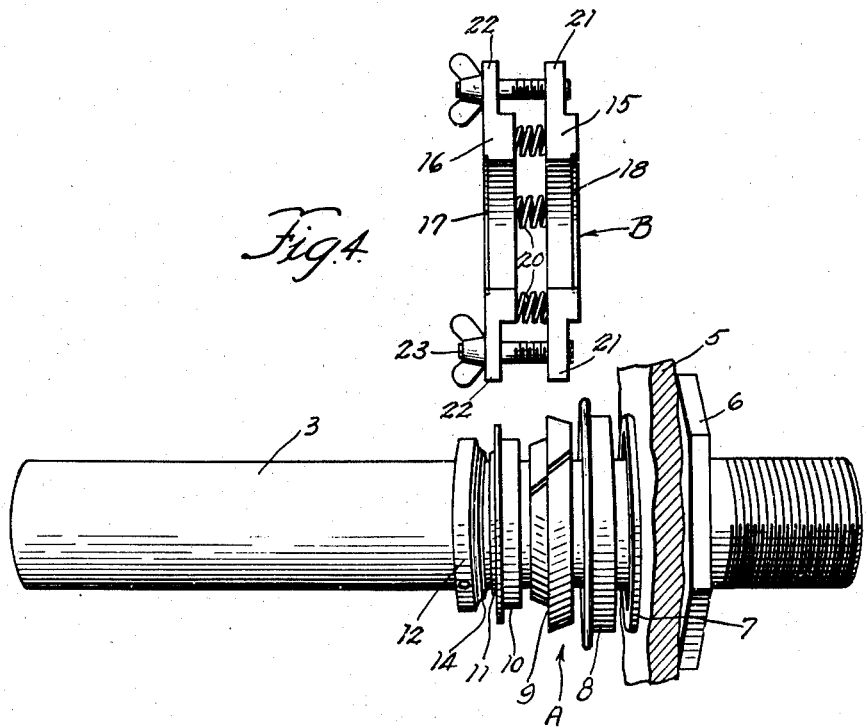
INVENTOR.
Olaf Larsen
BY Patented July 5, 1949

2,475,550

UNITED STATES PATENT OFFICE 2,475,550

SHAFT SEAL

Olaf Larsen, Oak Park, Ill., assignor to The Creamery Package Mfg. Company, Chicago, Ill., a corporation of Illinois Application April 24, 1947, Serial No. 743,559

3 Claims. (Cl. 286—11.15)

The invention relates to fluid seals for rotary shafts, and particularly relates to the sanitary type of rotary seals in which the parts are separable for cleaning.

Vats, pumps and other apparatus employed in the food industries for processing edible liquids must be thoroughly cleaned and sterilized frequently to maintain them in sanitary condition. It is essential that all shaft packing or sealing devices used in such apparatus and exposed to contact with the liquid may be readily disassembled for cleaning. It is the object of the present invention to provide an improved shaft seal structure in which all of its parts may be quickly and conveniently made completely accessible for thorough cleaning of all surfaces.

While, obviously, the invention may be adapted to other apparatus employing rotary shafts, it is herein described and shown in the accompanying drawings as adapted to a conventional vat having a rotary coil of pipe within the vat, the coil being connected to and supported upon a horizontal rotary hollow shaft which passes through opposite walls of the vat and is supported in bearings outwardly of the vat, the pipe coil and hollow shaft forming a conduit submerged in the liquid contents of the vat and adapted to carry a heat exchange medium. Such vats are well known and have long been in common use in the dairy industry for heating and cooling milk and other dairy products. The accompanying drawings show fragmentary portions of a vat wall and shaft with which the elements of the invention are associated.

Figure 1:
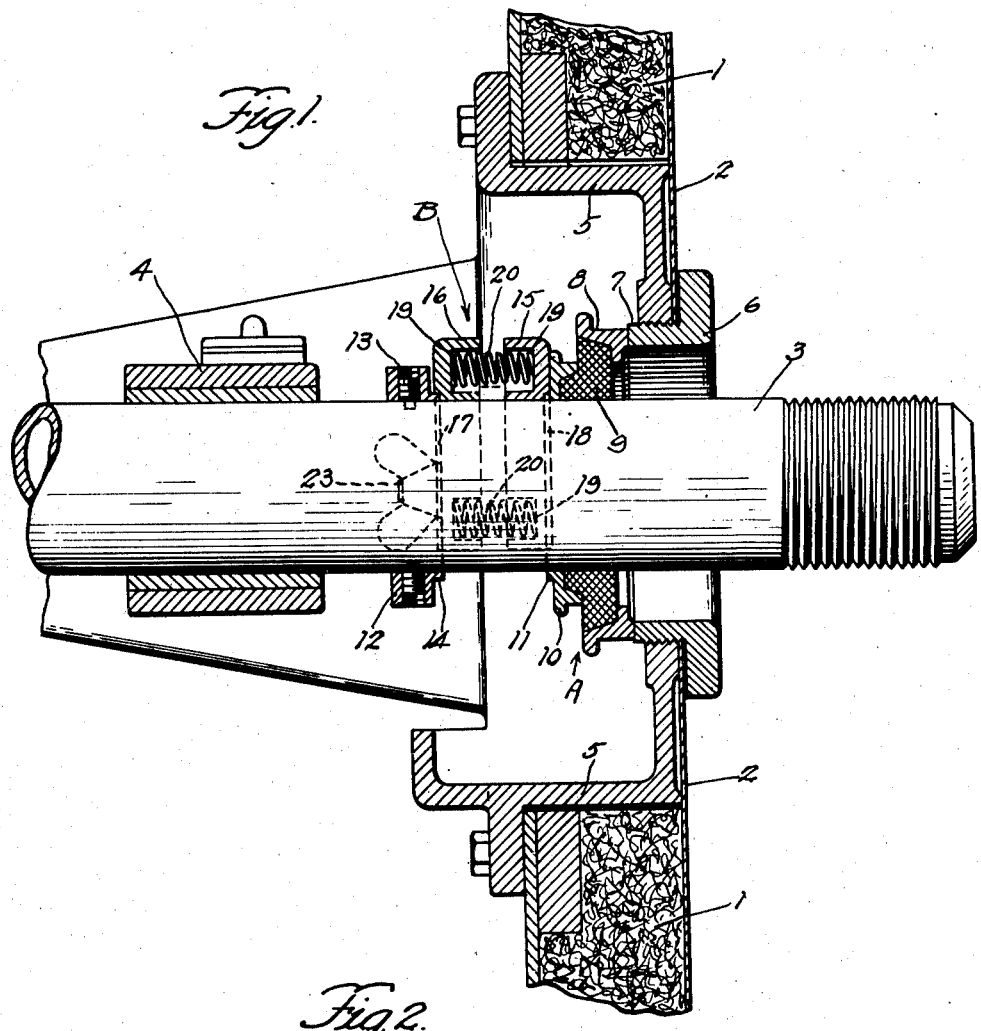
Figure 2:
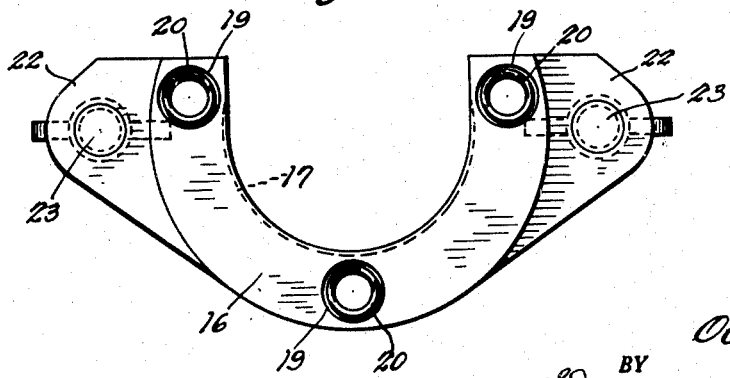

In the drawings, Fig. 1 is a vertical sectional view on the plane of the axis of the shaft. Fig. 2 is a side view of one of the elements of the retainer. Fig. 3 is a perspective view of the assembled shaft seal. Fig. 4 is a perspective view of the seal with the parts disassembled.

Referring to the drawings, the numeal 1 indicates a portion of a side wall of a vat having a sheet metal inner lining 2. A hollow shaft 3 passes through an opening in the wall and lining and is outwardly supported in a bearing 4. The threaded inner end of the shaft is adapted to receive and support one end of a heat exchange coil, not shown. An annular bracket 5 is positioned within the wall opening and provided with an outer flange secured to the wall 1 and an inner flange abutting the lining 2. A flanged sleeve 6 is threaded into the inner flange of the bracket 5, effecting a liquid tight clamping of the lining 2 to the bracket 5. The sleeve 6 is concentric with and substantially spaced from the shaft 3 and is provided with an outer extension 7 forming an annular sealing seat.

A rotary sealing unit A preferably comprises a seal ring 8, concentric with and spaced from the shaft 3 and operatively positioned in running abutment with the sleeve extension 7, thereby forming a contact seal against the passage of any liquid therebetween. A split packing ring 9, preferably of resilient material, is assembled about the shaft 3 and inserted within the seal ring 8, thereby supporting the seal ring 8 and forming a liquid seal between the ring 8 and the shaft 3. A back ring 10 is loosely mounted on the shaft in contact with the packing ring 9, and is provided with an annular bead 11 extending outwardly along the shaft. As herein described, the rings 8, 9 and 10 comprise the rotary sealing unit A. A collar 12 is secured upon the shaft 3 as by set screws 13, or may be integral with the shaft, and is positioned a substantial distance outward from the back ring 10. The collar 12 is provided with an annular bead 14 extending inwardly along the shaft and opposite to the bead 11 on the back ring 10.

The several rings 8, 9 and 10 of the sealing unit A are retained under axial pressure in the above described relative positions for operation by means of a retainer unit B removably interposed between the back ring 10 and the collar 12 and comprising a pair of spaced U-shaped complementary plates 15 and 16 which are loosely positioned astride the shaft 3. The outer plate 16 normally abuts the collar 12 and is retained against lateral withdrawal from the shaft by engagement of an annular recess 17, formed about the inner peripheral edge of the plate 16, with the bead 14 extending from the collar 12. The legs of the U-shaped plates 15 and 16 extend substantially beyond the cross diameter of the semi-circular portions of the inner peripheries of the plates, thus permitting the annular recess 17 in the plate 16 to be continued sufficiently beyond the cross diameter to form a locking construction (see Fig. 2) against lateral movement of the plate when engaged with the bead 14. The inner plate 15 is provided with a similar recess 18 engaging with the same effect the bead 11 on the back ring 10.

The opposed faces of the plates 15 and 16 are provided with registering pairs of pockets 19 within each pair of which is positioned a compression member 20, preferably a spring, the compression members tending to resiliently spread the plates apart and axially expand the retainer unit B. The members 20 are stressed to maintain the plates 15 and 16 in normal expanded abutment with the back ring 10 and the collar 12, and to apply sufficient resilient pressure through the back ring 10 to maintain the sealing functions of the packing ring 9 and the running seal ring 8. The plate 15 is provided with a pair of diametrically positioned lateral ears 21, and the plate 16 is provided with similar opposed ears 22. A pair of thumb screws 23 are loosely mounted in the ears 22 of plate 16 and extend into screw threaded engagement with the ears 21 of plate 15, thereby providing means for expanding or contracting the spaced inter-relation of the plates 15 and 16 against the interposed resilient members 20. The plates 15 and 16, the compression members 20 and the thumb screws 23 constitute the retainer unit B.

When disassembling the shaft seal, the thumb screws 23 are turned to draw together the plates 15 and 16 sufficiently to disengage the recesses 17 and 18 from the beads 14 and 11, whereby the retainer unit B may be withdrawn laterally from the shaft as indicated in Fig. 4. The seal ring 8 then may be moved axially away from the sealing seat 7, and the rings 8, 9 and 10 similarly separated from each other by movement along the shaft into the space vacated by the withdrawn retainer unit. The split packing ring 9 then may be opened and removed from the shaft. Thus all surfaces of the shaft 3 and of the several parts of the shaft seal subject to contact with the liquid being processed in the vat are readily accessible for thorough cleaning and sterilization. When re-assembling the shaft seal, the rings 8, 9 and 10 are replaced in position as first described, the retainer unit B is re-mounted on the shaft, and the thumb screws 23 are back turned to permit the compression members 20 to expand the plates 15 and 16 sufficiently to reengage the recesses 17 and 18 with the beads 14 and 11 and retain the several parts of the sealing unit A in operating relation.

I claim as my invention:

1. A seal for a rotary shaft comprising a stationary seat surrounding said shaft, a rotary sealing unit slidably mounted on said shaft and having contact with said seat, a collar fixed upon said shaft in spaced relation to said sealing unit, said sealing unit and said collar each having a fixed element extending into the space between them, and a U-shaped retainer unit normally positioned astride of said shaft between said sealing unit and said collar and having recesses therein in longitudinal register with said elements, said retainer unit being expansible longitudinally of said shaft into abutment with said sealing unit and said collar and thereby engaging said elements in said recesses to secure said retainer unit in position upon said shaft, and said retainer unit being reversely contractible to disengage said elements from said recesses and permit lateral withdrawal of said retainer unit from said shaft.

2. A seal for a rotary shaft comprising a stationary seat surrounding said shaft, a rotary sealing unit slidably mounted on said shaft and having contact with said seat, a collar fixed upon said shaft in spaced relation to said sealing unit, said sealing unit and said collar each having an annular bead extending into the space between them, a pair of spaced U-shaped retainer plates positioned astride of said shaft between said sealing unit and said collar and laterally removable from said shaft, each of said plates having a partial annular recess adapted to receive a portion of the adjacent one of said beads when said plates are positioned on said shaft, said recesses being more than a semi-circle in length, and a plurality of compression members supported between said plates tending to separate and expand said plates along said shaft into resilient abutment with said sealing unit and said collar, said recesses and said beads being inter-engaged to lock said plates upon the shaft when said plates are in expanded relation, and said recesses and said beads being disengaged to permit free removal of said plates from said shaft when said plates are in contracted relation.

3. A seal for a rotary shaft comprising a stationary seat surrounding said shaft, a rotary sealing unit slidably mounted on said shaft and having contact with said seat, a collar fixed upon said shaft in spaced relation to said sealing unit, said sealing unit and said collar each having an annular bead extending into the space between them, a pair of spaced U-shaped retainer plates positioned astride of said shaft between said sealing unit and said collar and laterally removable from said shaft, each of said plates having a partial annular recess adapted to receive a portion of the adjacent one of said beads when said plates are positioned on said shaft, said recesses being more than a semi-circle in length, a plurality of compression members supported between said plates tending to separate and expand said plates along said shaft into resilient abutment with said sealing unit and said collar and into lateral locking engagement between said recesses and said beads, and means for contracting said plates to disengage said recesses from said beads and permit lateral withdrawal of said plates from said shaft.

OLAF LARSEN.

REFERENCES CITED

The following references are of record in the file of this patent:

UNITED STATES PATENTS

| Number | Name | Date |
|---|---|---|
| 883,799 | Harbinger | Apr. 7, 1908 |
| 1,947,017 | McHugh | Feb. 13, 1934 |
| 1,958,246 | Olson | May 8, 1934 |

FOREIGN PATENTS

| Number | Country | Date |
|---|---|---|
| 166,283 | Germany | 1905 |